United States Patent [19]
Rice et al.

[11] Patent Number: 5,788,504
[45] Date of Patent: Aug. 4, 1998

[54] COMPUTERIZED TRAINING MANAGEMENT SYSTEM

[75] Inventors: Harold B. Rice, Franklin Furnace, Ohio; Robert C. McNair, East Setauket, N.Y.; Kenneth White, Shirley, N.Y.; Terry Maugeri, Wading River, N.Y.

[73] Assignee: Brookhaven Science Associates LLC, Upton, N.Y.

[21] Appl. No.: 543,298

[22] Filed: Oct. 16, 1995

[51] Int. Cl.$^6$ .................................. G09B 19/00
[52] U.S. Cl. ............................ 434/219; 707/100
[58] Field of Search ..................... 434/118, 219; 707/100

[56] References Cited

U.S. PATENT DOCUMENTS

| | | | |
|---|---|---|---|
| 5,180,307 | 1/1993 | Hiramatsu | 434/157 |
| 5,240,419 | 8/1993 | deGyarfas | 434/322 |
| 5,267,865 | 12/1993 | Lee et al. | 434/350 |
| 5,310,349 | 5/1994 | Daniels et al. | 434/350 |
| 5,311,422 | 5/1994 | Loftin et al. | 364/401 |
| 5,326,270 | 7/1994 | Ostby et al. | 434/362 |
| 5,372,507 | 12/1994 | Goleh | 434/118 |
| 5,395,243 | 3/1995 | Lubin et al. | 434/118 |
| 5,457,792 | 10/1995 | Virgil et al. | 395/600 |

*Primary Examiner*—Richard J. Apley
*Assistant Examiner*—John Roynak
*Attorney, Agent, or Firm*—Margaret C. Bogosian

[57] ABSTRACT

A Computerized Training Management System (CTMS) for providing a procedurally defined process that is employed to develop accreditable performance based training programs for job classifications that are sensitive to documented regulations and technical information. CTMS is a database that links information needed to maintain a five-phase approach to training-analysis, design, development, implementation, and evaluation independent of training program design. CTMS is designed using R-Base®, an SQL compliant software platform. Information is logically entered and linked in CTMS. Each task is linked directly to a performance objective, which, in turn, is linked directly to a learning objective; then, each enabling objective is linked to its respective test items. In addition, tasks, performance objectives, enabling objectives, and test items are linked to their associated reference documents. CTMS keeps all information up to date since it automatically sorts, files and links all data; CTMS includes key word and reference document searches.

8 Claims, 13 Drawing Sheets

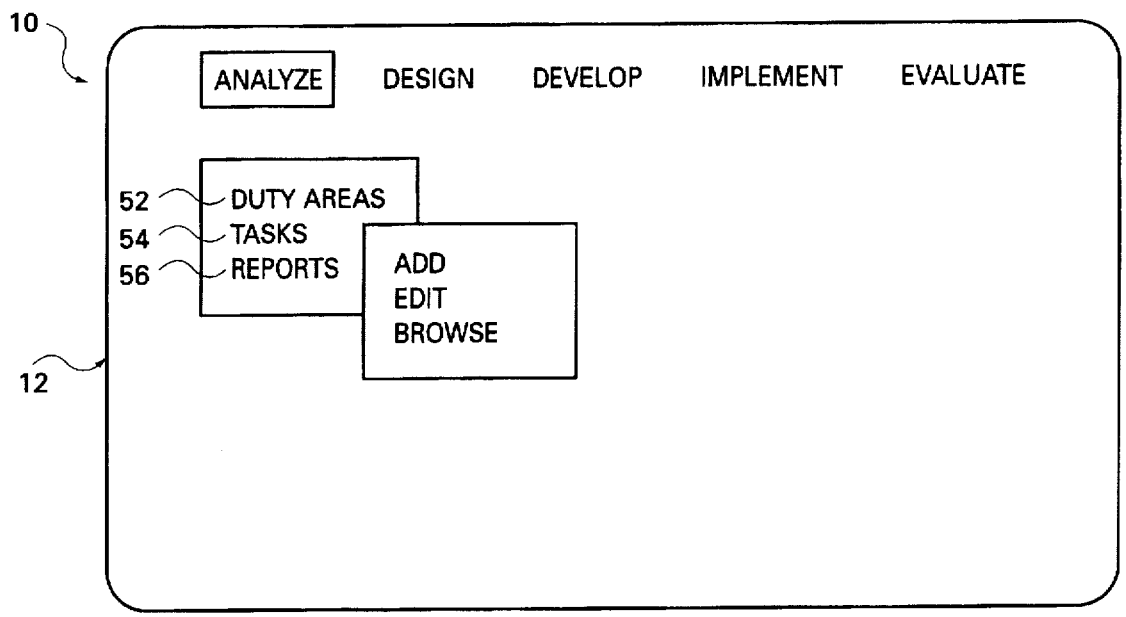

FIGURE 5

LIST OF DUTY AREAS

| CODE | DUTY AREA TITLE |
|---|---|
| 101 | ADMINISTERING THE REACTOR PROGRAMS |
| 201 | CONDUCTING MISCELLANEOUS DUTIES |
| 202 | CONFORMING WITH NUCLEAR REGULATIONS AND RULES |
| 203 | PERFORMING DAY CREW ACTIVITIES |
| 204 | PERFORMING SECURITY PROCEDURES |
| 205 | PERFORMING RADIATION PROTECTION PROCEDURES |
| 301 | PERFORMING REACTOR EMERGENCY OPERATIONS |
| 401 | PERFORMING REACTOR STARTUP, ROUTINE OPERATION AND SHUTDOWN |
| 501 | OPERATING THE PRIMARY COOLING WATER SYSTEM |

FIGURE 6

JOB ANALYSIS/TASK CHANGE FORM

| TRAINING PROGRAM: | REACTOR OPERATOR | | |
|---|---|---|---|
| DUTY AREA: | 301 – PERFORMING REACTOR EMERGENCY OPERATIONS | | |
| ORIGINAL TASK #: E1.2 | | UNIQUE TASK #: | 88 |
| | DUTY CODE | TASK#    ACTIVITY | JOB CODE |
| CROSS-REFERENCE TASK #: | 301 | *   006   *   04 | *   02 |

TASK TITLE

BUILDING EVACUATION (HFBR LOCAL EMERGENCY PLAN)

| REFERENCE DOCUMENTATION: | OPM #: | OTHER: BNL ERP PART II |
|---|---|---|
| | PDM #: | |

| TASK VALID?   YES/NO | SME SIGNATURE: _____ |
|---|---|

CHANGE PROCESS

| TASK DISPOSITION: | D = DELETION   /   A = ADDITION   /   R = REVISION: | R |
|---|---|---|
| JUSTIFICATION: | SPECIFIED IN REFERENCE – REPLACED OPM 3.2 WITH BNL ERP PART II (HPC 37-93) | |
| TRANSFER TASK TO: | | |

NEED FOR TRAINING

| TRAIN: (Y/N) | Y | LEVEL(S):   INITIAL   /   CONTINUING   /   PRETRAINING |
|---|---|---|
| | | RT030741   RT040290 |
| | | O-J-T:   (PROPOSED COURSE CODES) |
| JUSTIFICATION: | | |

SIGNATURES

| SUBMITTED:   HBR | |
|---|---|
| REVIEWED (SME) DATE:   07/22/1993 | INITIALS:   RCM |
| DATA ENTRY:   DATE:   07/22/1993 | INITIALS:   HBR |

FIGURE 7

TEST ITEM INPUT/CHANGE FORM

| TRAINING PROGRAM: REACTOR OPERATOR | |
|---|---|
| COURSE LESSON PLAN CODE: RT030161 | PERFORMANCE OBJECTIVE #: |
| UNIQUE ENABLING OBJECTIVE #: 60 | ENABLING OBJECTIVE #: 1 |
| UNIQUE TEST ITEM#: 1 | TEST ITEM #: 1 |
| (NOTE: UNIQUE 3'S = COMPUTERS #'S) | FIGURE#: |

OBJECTIVE STATEMENT
    STATE THE PRIMARY FUNCTION OF THE PRIMARY COOLING WATER SYSTEM.

| ITEM DISPOSITION: D = DELETION / A = ADDITION / R = REVISION : | R |
|---|---|

TEST ITEM STATEMENT
    STATE THE PRIMARY FUNCTION OF THE PRIMARY COOLING WATER SYSTEM.

TEST ITEM ANSWER/POINT VALUES:
    REMOVE HEAT FROM FISSION FROM FUEL ELEMENTS.

| SHORT ANSWER & COMP / ESSAY / MULTIPLE CHOICE / T-F / MOD. T-F / MATCHING | |
|---|---|
| SELECTED TYPE OF ITEM: < SHORT ANSWER & COMP > | |
| DIFFICULTY RATING: 1 | RESPONSE TIME: 20 SECONDS |
| POINT VALUE: 0.5 | QUIZ (Y/N) Y |

VALIDATION/SIGNATURES

| SUBMITTED: HBR | | |
|---|---|---|
| REVIEWED (SME): DATE: 11/01/1991 | 1 | INITIALS: RCM |
| DATA ENTRY: DATE: 04/08/1993 | 0.5 | INITIALS: HBR |

END OF REPORT: TIFORM FOR UNIQUE TEST ITEM #: 1      09/27/1995
CERTIFICATION CATEGORIES:

CERT. CODE      CERTIFICATION CATEGORY TITLE
2.1      SYSTEMS

END OF REPORT: TIFORM FOR UNIQUE TEST ITEM #: 1      09/27/1995
REFERENCES:
REFERENCE ID CODE      REFERENCE TITLE
PDM5.1      PRIMARY COOLING WATER SYSTEM
OPM 3.13      SEISMIC EVENT RESPONSE PROCEDURE

FIGURE 13

COMPUTERIZED TRAINING MANAGEMENT SYSTEM

This invention was made with Government support under contract number DEAC02-76CH00016, between the U.S. Department of Energy and Associated Universities, Inc. The Government has certain rights in the invention.

BACKGROUND OF THE INVENTION

The present invention relates generally to a computerized training management system. More particularly, this invention relates to such a system that efficiently links a variety of desired reference manuals to related training materials so that the system may be easily utilized by trainers in creating and maintaining the training and reference materials in an up-dated condition, as well as being readily usable and accessible by trainers, trainees, managers, administrators and incumbents, i.e. personnel who have already been qualified by earlier training, but who require periodic refresher training.

In large complicated operating and control systems, such as those used to operate, maintain, and control oil-fired or nuclear powered electrical power generating plants, chemical and other material processing plants, etc., it is necessary to extensively and continuously train plant operating personnel. To accomplish such training, operating procedure manuals are typically developed by the plant system designers and engineers for aiding operators in efficiently operating the systems. Often such operating procedure manuals alone are not sufficient for enabling an operator or operators to properly or efficiently and safely operate a given system. Accordingly, supplementary training materials, manuals and examinations incorporating numerous aspects of such an operating procedures manual for the more complicated features of the system, are often separately developed by trainers as aids to further enhance the skill, knowledge, and operating capabilities of the operators and maintenance personnel. However, a shortcoming of such developments is that since operating procedure manuals and training materials are separately developed, they may not consistently contain updates, deletions and modifications made to the system, which would preferably require related changes to be made uniformly to the operating procedure manual and all the separately developed training materials. Such continued revisions necessitate numerous time consuming, and usually manual, updating of numerous training manuals, examinations, etc.

Separate from the issue of how best to maintain and manage training materials, the complete and efficient training of plant systems operators can be further improved by using other computerized training techniques. It is well known that a number of attempts have been made to aid in the development of computerized training of operators and technical personnel of large complicated operating systems, as well as in the training of users of products produced by such systems. An example of one such attempt employs computerized simulation, as is taught by U.S. Pat. No. 5,240,419, granted to deGyarfas, in its disclosure of an interactive training system for simulating an operating system environment. Display screens with simulations thereon, and a plurality of manipulable input devices permit an operator or user to interact with the training system. Similarly, U.S. Pat. No. 5,395,243, granted to Lubin, et al. discloses a computerized interactive learning system for use in teaching an application program such as a word processing program. Also, U.S. Pat. No. 5,311,422 , granted to Loftin, et al. discloses a training program having a plurality of training tasks within a specific environment, where the performance of each task comprises performance of certain procedural steps called actions, such that each task is correlated to at least one desired action, called a correct action, and training is accomplished using the system by having a trainee perform simulated tasks repetitively on a computer.

Again, separate from the task of maintaining and managing training materials, a more common attempt to aid in training of individuals, particularly scholastic students, is a type of training system utilizing an interactive question and answer format. For example, U.S. Pat. No. 5,372,507 granted to Goleh discloses such a method for teaching the practical application of a subject. A student is furnished with an introductory body of information encompassing the field of the subject to be taught and is then presented with a simulated life-like situation including a stated goal to be achieved. Attaining the goal requires the student to complete, in a desired order, a series of steps that may be correctly determined by properly utilizing the body of information.

Similarly, U.S. Pat. No. 5,180,307, granted to Hiramatsu, discloses a learning enhancement apparatus using audio teaching material, and U.S. Pat. No. 5,267,865, granted to Lee, et al., discloses an educational method that requires the use of interactive audio-visual materials. Also, U.S. Pat. No. 5,310,349 granted to Daniels, et al. discloses a virtual school from which a student can access instructional information. Expanding on these types of training systems is the teaching of U.S. Pat. No. 5,326,270 granted to Ostby, et al. which discloses a system for assessing an individual's task-processing style by presenting the individual with a simulated situation and recording the individual's responses while resolving the situation.

A common drawback in the above types of training systems is that they are generally developed separately from related operations procedure manuals or reference manuals. This leads to updates, deletions and modifications that are frequently made to the system often necessitating time consuming changes to be separately made to other materials used in the training system.

There is a need for a computerized training management system that efficiently integrates and links various reference manuals to various training materials, as well as which links various aspects of the training materials, so that the system can be easily utilized by trainers in managing and updating the training materials based on changes to the system. There is also a need for a computerized training management system that is easily usable and accessible by trainees, incumbent administrators and managers.

SUMMARY OF THE INVENTION

The Computerized Training Management System (CTMS) of the invention is a procedurally-defined process and related implementing means employed to develop accreditable performance-based training programs for job classifications sensitive to documented regulations and technical information. The supporting software consists of a series of applications operating a Relational Database Management System using an SQL-compliant software platform. No pre-determined learning processes are modeled or employed in the software structure or method steps to restrict user to subject area selection.

Accordingly, it is an object of the present invention to provide a computerized training management system (CTMS) for use by trainers in implementing and managing a process for developing an accreditable performance-based training program based on documented regulations and technical information.

It is also an object of the present invention to provide a CTMS that is an "open architecture" system, not limited to a linear or branched learning methodology typically employed in computer based training methodologies, and not restricted to a specific subject area selection for a trainees use.

It is another object of the present invention to provide a CTMS that is useful in support of individualized instruction by providing an On-The-Job Trainer/Trainee team with desired information during both instruction at a job site and instruction for guiding the trainee's individual study sessions.

It is another object of the present invention to provide a CTMS that is unrestricted in allowing a trainer/trainee to perform "key-word" searches, reference document relationship sorts, and use of unlimited combinations of filtering mechanisms in which to select and present information from the various databases accessible by the CTMS.

It is another object of the present invention to provide a CTMS in which the system links various reference manuals, e.g., operating procedure manuals, administrative procedure manuals, maintenance manuals, tickler cards, reportable occurances, technical specifications, safety analysis reports, etc., to various related training materials.

It is another object of the present invention to provide a CTMS in which the system enables a trainer to quickly and easily maintain and update training materials to incorporate changes made in related reference manuals.

It is another object of the present invention to provide a CTMS in which the system enables a trainer to quickly and easily generate a variety of new training materials.

It is also another object of the present invention to provide a CTMS in which the system enables generating training materials which include tasks, performance objectives, learning objectives and test items.

It is yet another object of the present invention to provide a CTMS in which the system links via interface means tasks to performance objectives which are linked to learning objectives and finally to test items.

It is still another object of the present invention to provide a CTMS for implementing a five phase approach to a computerized management system which includes, Analysis, Design, Development, Implementation and Evaluation.

It is a further object of the present invention to provide a CTMS in which the system links via interface means specific reference documents to related tasks, performance objectives, learning objectives and test items.

It is also an object of the present invention to provide a CTMS in which the system keeps count of total products in the system, a current count of courses, lesson plans/guides, tasks, performance objectives, job performance measures, terminal learning objectives, enabling learning objectives and test items.

It is yet a further object of the present invention to provide a CTMS in which the system keeps track of changes in existing training programs that need to be evaluated relative to changes caused by assigning different personnel to evaluating tasks, learning objectives, test items, develop training materials and as a system which keeps track of program implementation as a result of change to update current subject experts, as well as documenting such actions.

It is a further object of the present invention to provide a CTMS in which the system prints reports that consist of summary information, task to performance objective, practical requirements, knowledge requirements, job performance measures, test items, tasks to train cross-reference, train to task cross reference, performance objective to on-the-job guide, task list, qualification cards/guides and examinations that are replicas of the generator screen for user friendliness.

Certain of the foregoing and related objects are readily obtained in a CTMS constructed to embody the novel concepts of the subject invention.

Certain of the foregoing and related objects are also readily obtained in a method for implementing the novel steps of the invention.

At the highest order, it is the object of the present invention to provide a CTMS in which the system access multiple data bases in multiple training programs in a predetermined manner to generate reports and facilitate evaluation.

BRIEF DESCRIPTION OF THE DRAWINGS

Other objects and features of the present invention will become apparent from the following detailed description considered in connection with the accompanying drawings, which disclose several embodiments of the invention. It is to be understood that the drawings are to be used for the purpose of illustration only and not as a definition of the limits of the invention.

In the drawings, wherein similar reference characters denote similar elements throughout the several views:

FIG. 5 is the main menu display screen of the CTMS shown in FIG. 3 showing the "ANALYZE" menu and its sub-menus in greater detail;

FIG. 6 is a display screen of a list of example duty areas accessible through "DUTY AREAS" sub-menu shown in FIG. 5;

FIG. 7 is a display screen of a Job Analysis/Task Change Form accessible through "TASKS" sub-menu shown in FIG. 5;

FIG. 13 is a display screen of a Test Item Input/Change Form accessible through "TEST ITEMS" sub-menu shown in FIG. 12;

DETAILED DESCRIPTION OF THE INVENTION

Peripheral computer devices are not required to support the CTMS features. This simplifies the hardware and software required for a given embodiment and thereby lowers the initial start up and operating expense significantly. Use is normally intended to be primarily in support of individualized instruction by providing the On-the-Job Trainer/Trainee team with desired information during instruction at the job site and through self study. The CTMS applications may be used in support of lectures or training seminars by providing the Classroom Trainer with on-screen displays of information relating to subject areas or job tasks. Workstations share and transfer data on-line via the network. Each product may be printed to any two of the selections of SCREEN, PRINTER, or a FILE. Hierarchical coding provides only a recommended order to pursue learning curricula and achieve job tasks. The Trainer, Trainee, Administrator and Program Evaluator may select electronic textual reference information in a subject area or data supporting a job task or a reference document independent of the curriculum structure. The CTMS is an "open architecture" system, with no restrictions in the structure or method steps to limit the user's access to or filtering of information from the databases.

A trainer, familiar in SQL programming, may easily modify features in the applications. The greater scope of the CTMS embodies all five of the phases of training: Analysis, Design, Development, Implementation and Evaluation. Access to the data in the CTMS is unrestricted, with features such as "key words" searches, reference document relationship sorts and date periods specifications permitting the user to select and present information from the database by unlimited combinations of filters.

Figure 1:
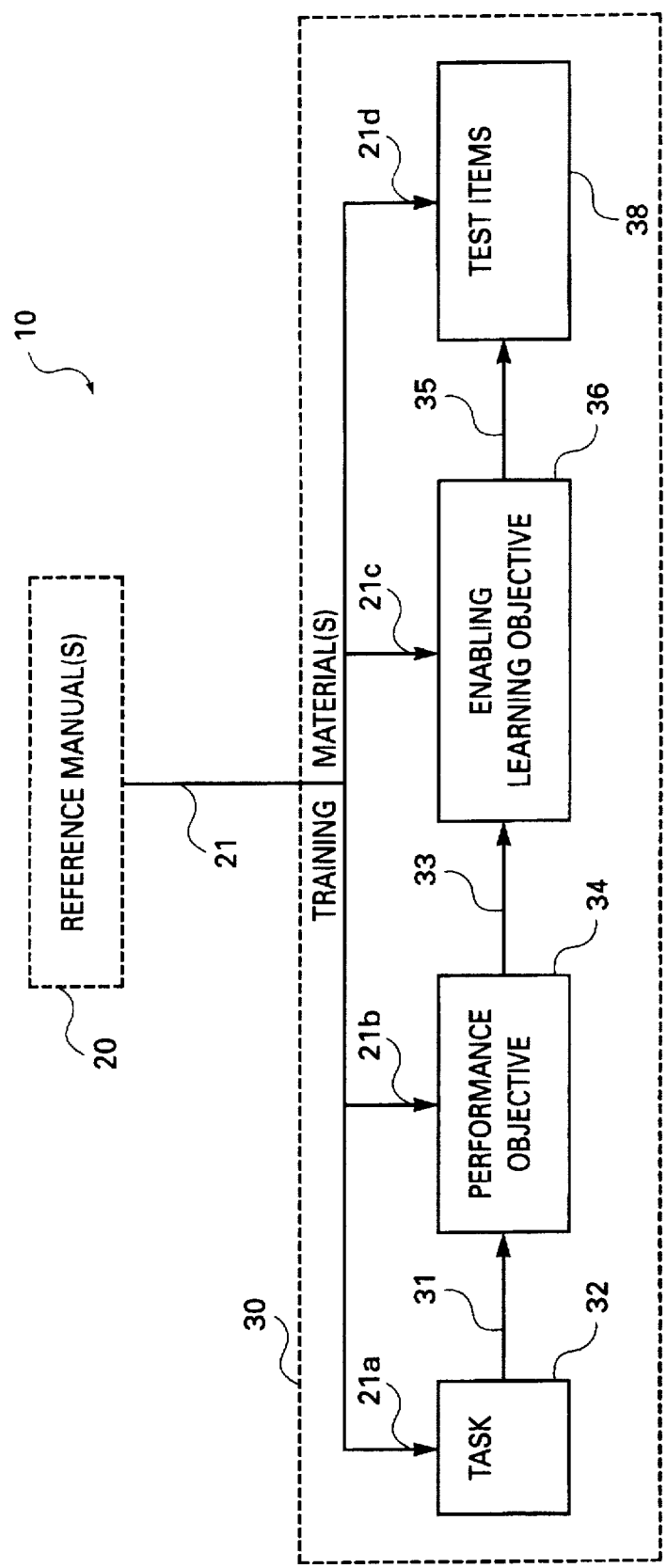
FIG. 1 is a graphical representation of a computerized training management system (CTMS) embodying the present invention and showing the relationship in the illustrated embodiment of reference manuals linked to a variety of different phases of training and their related materials.

The system will report to the user by error warnings in the event of unavailability of data conforming to the search criteria entered. An important feature of the disclosed CTMS is that the lesson/task/topic material is not in the structure. The user must access recommended reference/training materials as identified in a cross-reference. For implementation, only self-study questions/answers are accessible to the trainee from the storage device. A complete examination bank of questions/answers is provided as a component feature to facilitate that portion of the development phase dealing with exam construction by the trainer. The structure facilitates information presentation and invites review and comment with commensurate editing features to invite feedback from each user. The CTMS permits each user to enhance the system through an open architecture using the platform software database management tools to create any desired variations in structure or process. Guidance is provided and criticism invited through the method steps employed. The structure is not locked, nor encoded in any manner. All stations can output questions and display answers supporting self-study. All users can select access to data duplicated in the generation of a Wide Area Network (WAN) version of each training program. This permits editing of the stored data without affecting the original data. This feature of limiting workstations on the amount of information displayed is determined by the trainer/administrator during the automated means to create the WAN data storage version. The evaluation applications provide for monitoring the training program content. Report generation may be prompted by all stations. FIG. 1 will be referenced to assist in describing the detailed embodiments and claims of the software applications.

Turning now to the drawings and in particular to FIG. 1, which illustrates a graphical representation of computerized training management system (CTMS) 10 embodying the present invention in which reference manuals 20 is efficiently related via means 21 to training materials 30. Specifically, CTMS 10 is a computerized system that efficiently relates reference manuals 20 and a wide variety of different training materials 30 into an integrated system that facilitates rapidly updating training materials 30 to reflect changes when they are made in reference manual 20. CTMS 10 is not only easily utilized by trainers, but also by trainees, and incumbent administrators and managers through access to CTMS 10 and its capability to generate various products which are explained in greater detail below.

Referring again to FIG. 1, CTMS 10 includes two novel relational components. First, CTMS 10 is a system that relates various reference manuals 20 via means 21 to training materials 30. Specifically, reference manuals 20 are related via means 21a to a selected task 32, and by means 21b to a desired performance objective 34, and via means 21c to chosen enabling learning objectives 36, and by means 21d to predetermined test items 38. In addition, within training materials 30 each task 32 is related directly via link means 31 to performance objective 34, which, in turn, is related directly via link means 33 to enabling learning objective 36; then, each enabling learning objective 36 is related directly via link means 35 to respective test items 38. The novelty and strength of CTMS 10 is in its various relationships or linkages between each of the variety of training materials 30 and reference manuals 20, as well as in its various relationships or linkages between the different training materials 32, 34, 36 and 38. The various relationships and linkages will become more apparent with the following description.

CTMS 10 contains a number of modes of use for various users. First, CTMS 10 allows trainers to rapidly create training materials 30 which are automatically related to various reference manuals 20. Second, CTMS 10 allow trainers to easily and quickly update existing training materials 30, as needed to accommodate changes in reference manuals 20. Third, trainees can access various study materials and generate self-tests contained in training materials 30. Fourth, administrators can efficiently track various categories of information through CTMS 10. These various modes of use are described in greater detail below.

Figure 2:
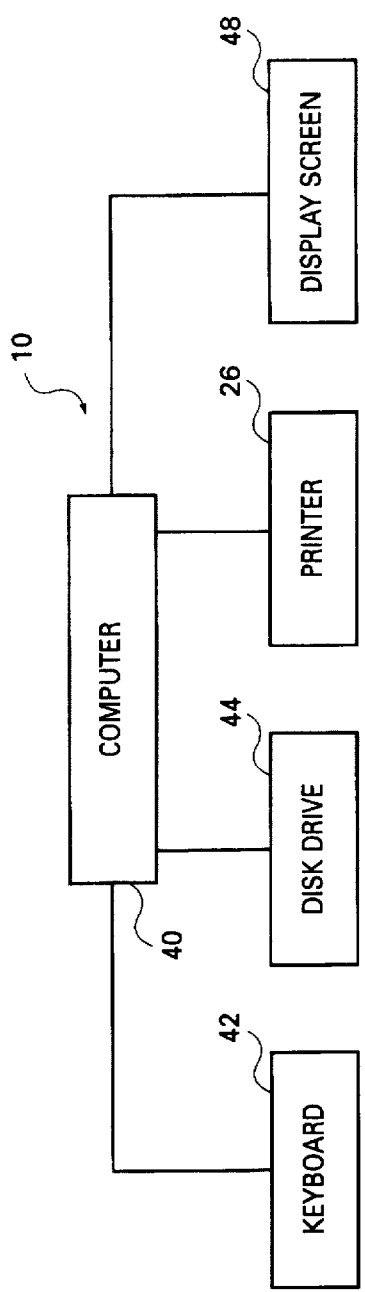
FIG. 2 is a diagrammatical representation of a computerized system hardware components used to implement the CTMS shown in FIG. 1.

Referring to FIG. 2, an alternative representation of CTMS 10 is shown to explain a preferred embodiment of suitably connected hardware components. Specifically, CTMS 10 suitably utilizes a conventional personal computer 40 such as an IBM-386 model and up with at least 6 megabytes of RAM. Conventional input and output devices such as a keyboard 42, disk drive 44, printer 46, and display screen 48 provide for input and output of data for operating the system. The file server 14 is necessary where networked work stations are used. The embodiment of the invention disclosed here was designed using R-Base® 4.5+, a relational database system using a Structured Query Language (SQL)-compliant software platform for writing SQL code to perform operations on various relational databases. R-Base® is manufactured and is commercially available from Microrim Corporation. It will be appreciated that other SQL software application programs such as D-Base®, manufactured by Borland International, Inc. and Foxpro® manufactured by Microsoft Corporation would be made suitable for use in practicing the present invention.

Figure 3:
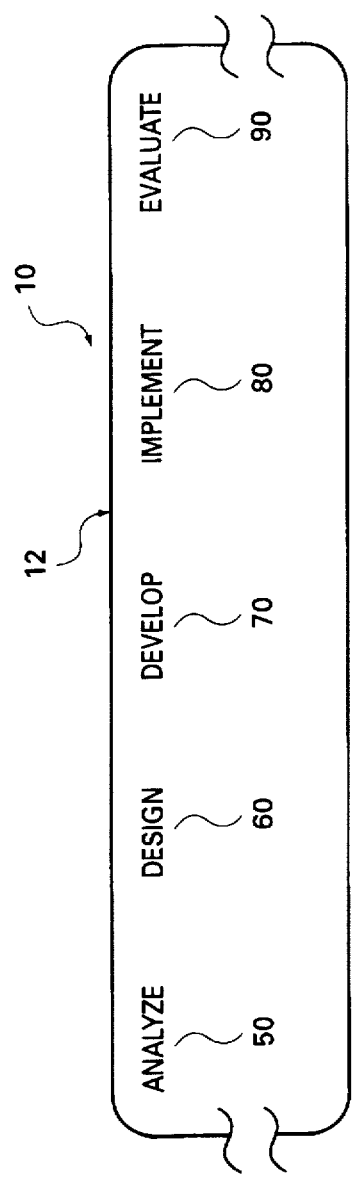
FIG. 3 is a main menu display screen of the CTMS shown in FIGS. 1 and 2, showing "ANALYZE", "DESIGN", "DEVELOP", "IMPLEMENT" and "EVALUATE" menu items.

Referring now to FIG. 3, an options display menu 12 for the CTMS 10 is shown. Menu 12 enables an operator to initially create a computerized training management system for a training program and update the system for use by trainers, trainees, and incumbent administrators and managers. Specifically, CTMS 10 utilizes a five-phase systematic approach to performance-based training namely, phases or menu items, "ANALYZE" 50, "DESIGN" 60, "DEVELOP" 70, "IMPLEMENT" 80, and "EVALUATE" 90, are provided for entering curricula data and performing the linking and relating of reference manuals 20 to training materials 30.

Figure 4A:
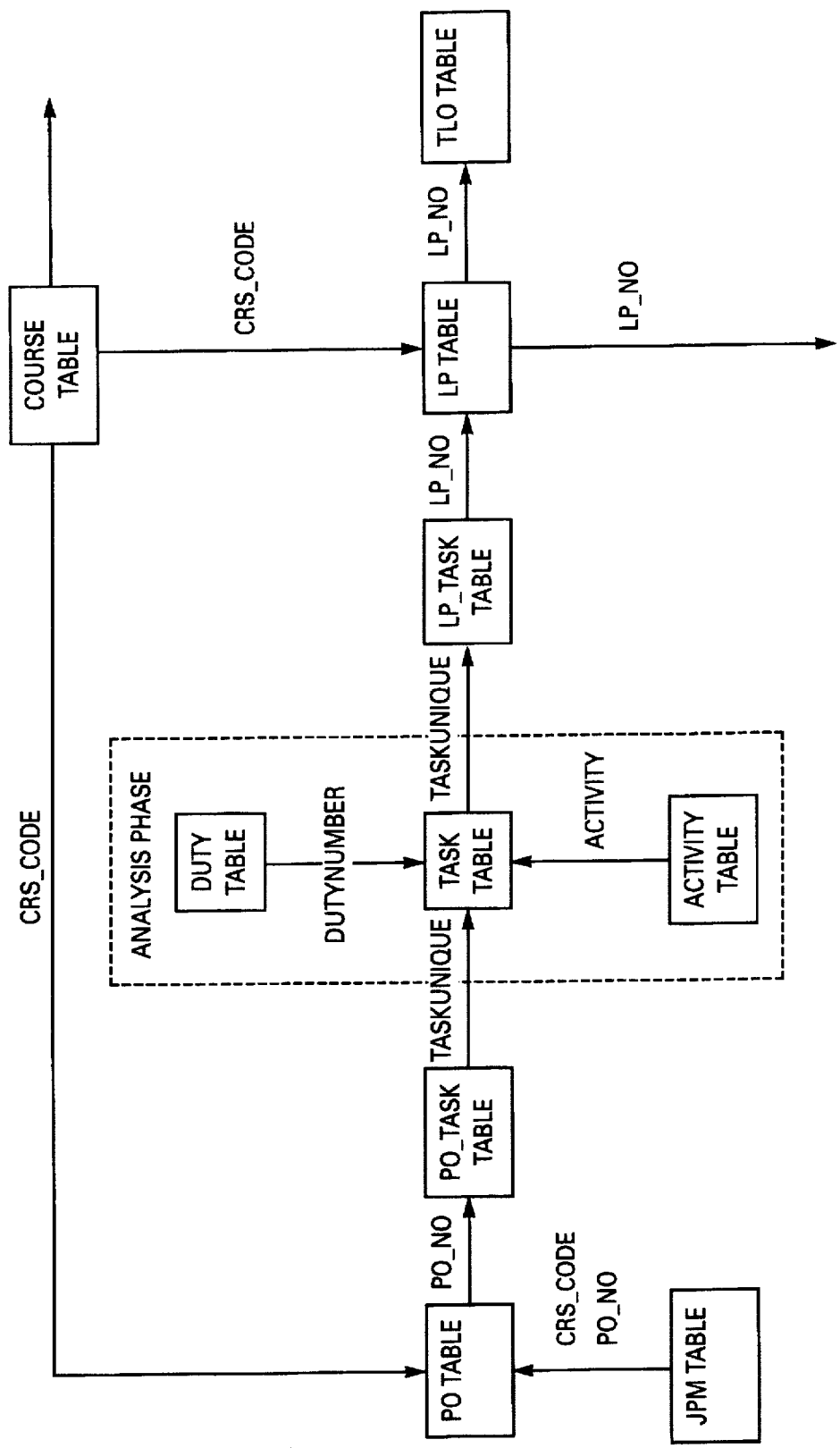
FIGS. 4a to 4c are a computer data base interrelations flow chart representation of the CTMS shown in FIG. 1.
Figure 4B:
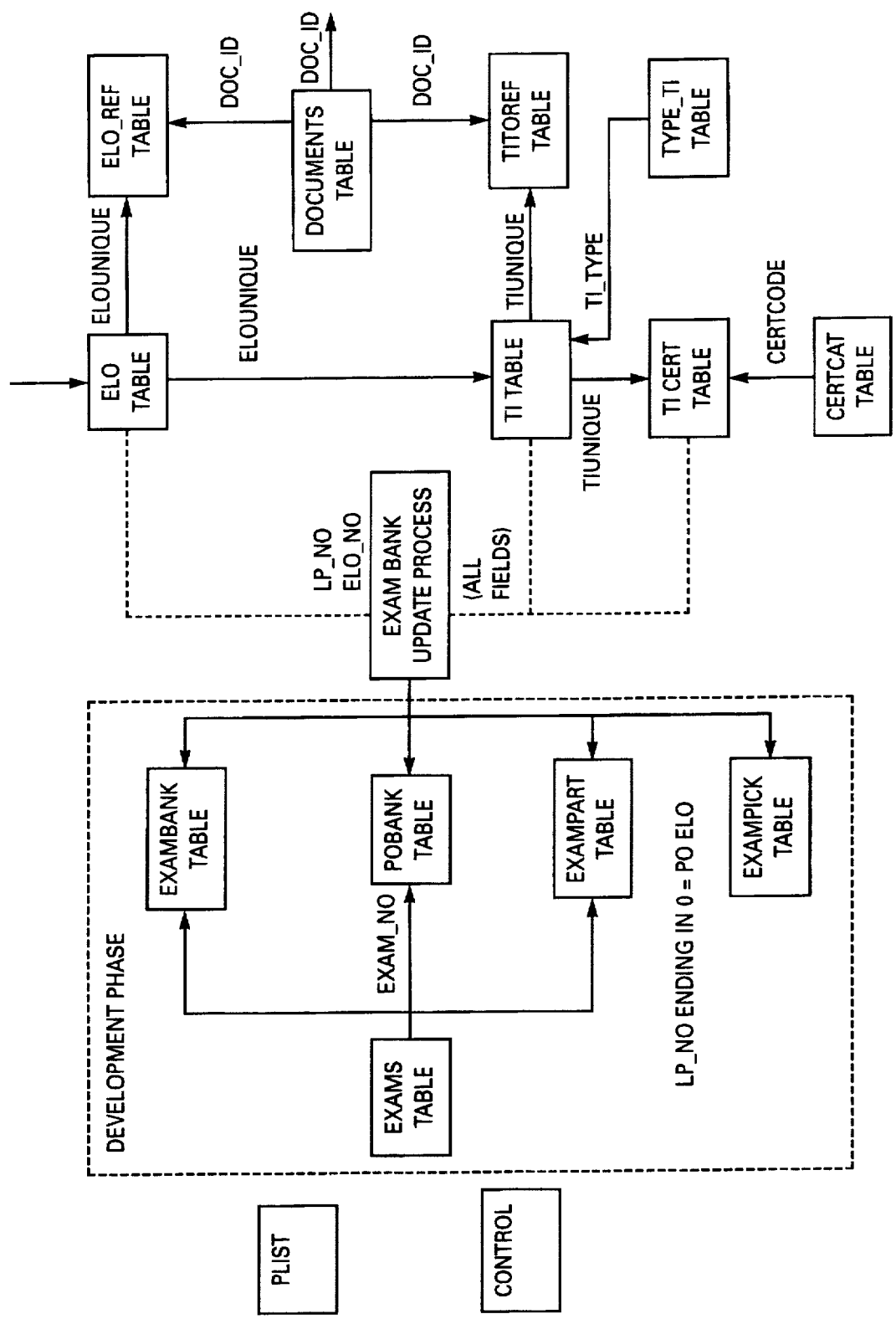
Figure 4C:
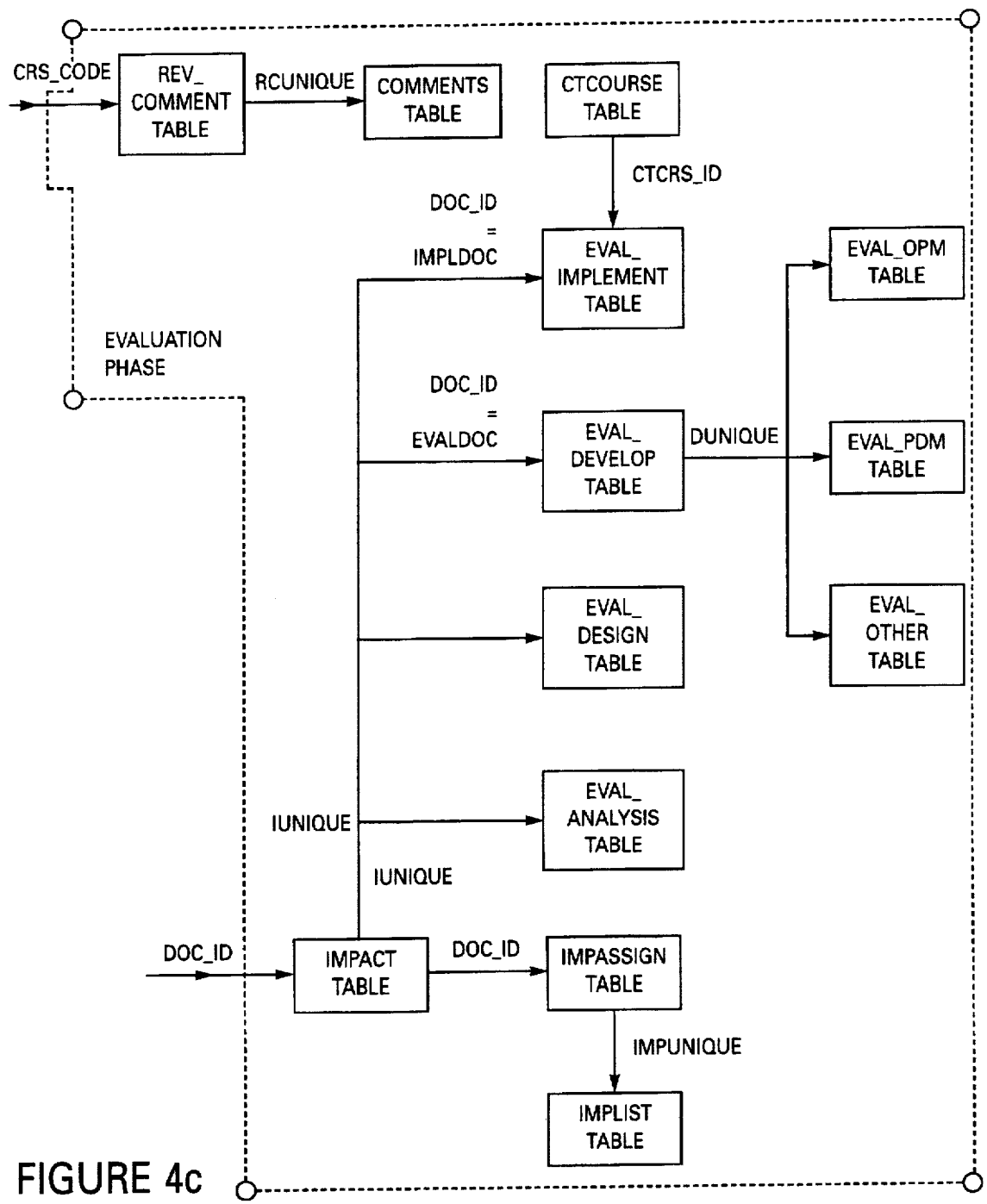

Referring to FIGS. 4a to 4c, there is shown a data base interrelations flow chart describing CTMS 10 as including these training phases; Analyze 50, Design 60, Develop 70, Implement 80, and Evaluate 90. The detail for the preferred embodiment disclosed herein is presented in a phase-by-phase fashion, modeled after the systematic approach to performance-based training employed through the CTMS and associated procedures. The following is an overview of the five phases used in the preferred embodiment:

1. Analysis Phase

Referring now to FIG. 5, Analysis phase 50 of CTMS 10 consists of "DUTY AREAS" 52, "TASKS" 54 AND "REPORTS" 56. During Analysis phase 50 under "DUTY AREAS" 52 general categories or duty areas are compiled. An additional table, Jobs Table, may be added, should the administrator feel a look up listing for several jobs using the same program would be convenient to the user. Selecting "DUTY AREAS" 52 from menu 12 displays a list 52a as shown in FIG. 6, which allows inputting, editing or browsing list 52a with descriptions of general categories or duty areas.

Likewise, as shown in FIG. 5, selecting "TASKS" 54 from menu 12 allows accessing a "Job Analysis/Task Change Form" 54a as shown in FIG. 7. Job Analysis/Task Change Form 54a allows for identifying, adding, editing, or browsing various tasks. The Duty and Activity tables fields serve as look up listings following the creation of a job listing and job descriptions. The common fields between the tables consist of a breakdown of the task cross-reference number, as recommended by accrediting institutions. The Tasks Table fields contain the data used in constructing the Job Task Cross-Reference Report. The important connection to reference document(s) for each task is created here as a justification to validate tasks during this procedure.

Referring still to FIG. 7, information contained and linked in the Job Analysis/Task Change Form 54a includes Duty Area code(s) 51, Original Task number, a computer generated unique task number, cross-reference task number 55a which includes Duty Area code, Task Number, Activity number, and Job Code. A change process section, labeled Justification 57 identifies action taken on each Task 55b that is added, deleted or revised and includes a justification statement. Other information on Job Analysis/Task Change Form 54a includes, task links such as Task validation and disposition that are transferable to other training programs, identifying either need for training or a justification statement for no training, and links to the levels of training which include initial, continuing and pre-training level courses, and identifying personnel who submitted documents, subject matter experts, and data input dates.

Importantly, determination is made as to whether a given task 55b is to be linked to reference manual 20 and if so the task is appropriately linked to a specific primary, secondary or multiple reference manual(s) that validate the task 55b for the job.

Selecting "REPORTS" 56, shows reports generated under Analysis 50 (FIG. 5) include the Job Analysis/Task Change Form for each task, related job task cross-reference, Task Title selected for training, justification for task addition, or deletion, revision, and justification for not training.

In utilizing CTMS 10, at the completion of Analysis phase 50, a curriculum plan is developed which identifies each course needed respectively, to complete General Level Training, Fundamental Training, Initial Training, and Continuing Training courses. Those skilled in the art will recognize that such various training courses are easily created and maintained by using the disclosed CTMS 10.

2. Design Phase

The following database tables are components of the Design Phase: (those outside the dashed boxes in FIGs. 4a to 4c)

PO TABLE . . . Performance Objectives
JPM TABLE . . . Job Performance Measures
PO_TASK TABLE
COURSE TABLE . . . Curriculum Course Titles
LP TABLE . . . Lesson Plans
TLO TABLE . . . Terminal Learning Objectives
ELO TABLE . . . Enabling Learning Objectives
LP_TASK TABLE
TI TABLE . . . Test Items
CERTCAT TABLE . . . Certification Categories
TI_CERT TABLE
TYPE_TI TABLE
DOCUMENTS TABLE . . . Reference Documents
ELO_REF TABLE
TITOREF TABLE The critical interrelations within this phase are indicated by the cross-referencing tables (those not titled above). A strong sensitivity to the source documentation is required for the feedback and evaluation features to function with accuracy and timeliness. The curriculum is typically designed and presented in a flow chart manner and course codes assigned in a consistent manner. The curriculum is translated from the flow chart to the database in the Course Table entries. This is the first level of design phase information management. The next level is established by identifying the lesson plans for each course and thence the LP Table entries. A parallel information management path is initiated through the enhancement of tasks selected for training into performance objectives in the Performance Objective Table entries. The continuity and traceability to the source is retained through PO_Task and LP_Task table entries. In the version described herein, the Terminal Objectives are not used to manage information, only to describe the content and achievement level of the student upon completion of the lesson by entries in the TLO Table. An alternative structure permits management of the information using Terminal Objectives. The detailed objectives are developed as entries to the ELO Table. Multiple-table forms are used to enter such information, using a model Course Training Specification format. Questions are developed for the Enabling Objectives as entries to the TI Table. Certification Categories may be entered and used to further manage the examination information. The DOCUMENTS Table is the critical link to the Evaluation Phase feature. The MAINTAIN Application, to be covered in more detail later, provides a merging and duplicating EXAM BANK UPDATE PROCESS employed to establish a listing of all the questions in an independent examination bank for use in the Development Phase.

Figure 9:
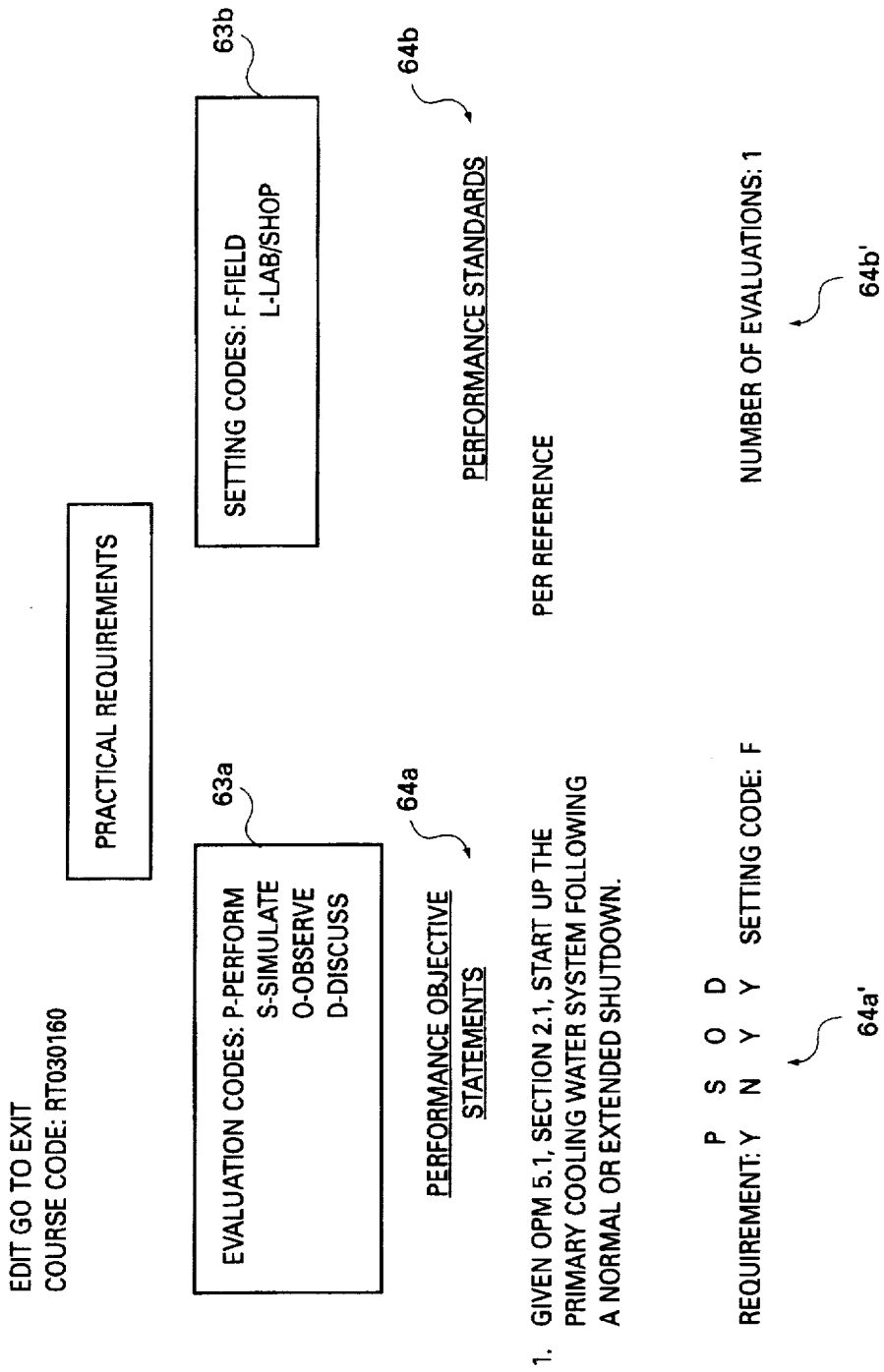
FIG. 9 is a Practical Requirements display screen accessible through "PRACTICAL REQUIREMENTS" sub-menu shown in FIG. 8.
Figure 8:
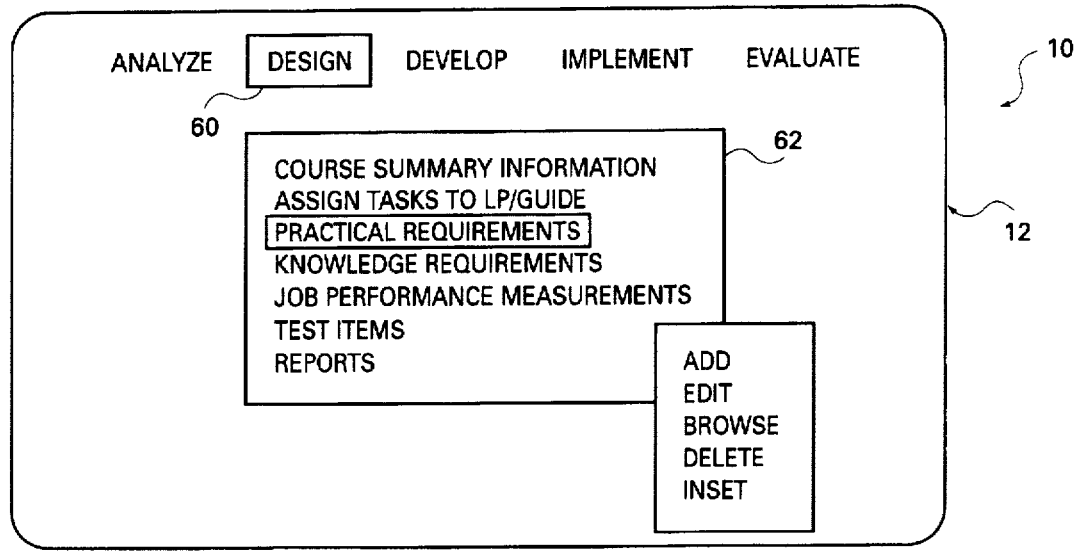
FIG. 8 is the main menu display screen of the CTMS shown in FIG. 3 further showing details of the "DESIGN" menu, and specifically a "PRACTICAL REQUIREMENTS" sub-menu.
Figure 10:
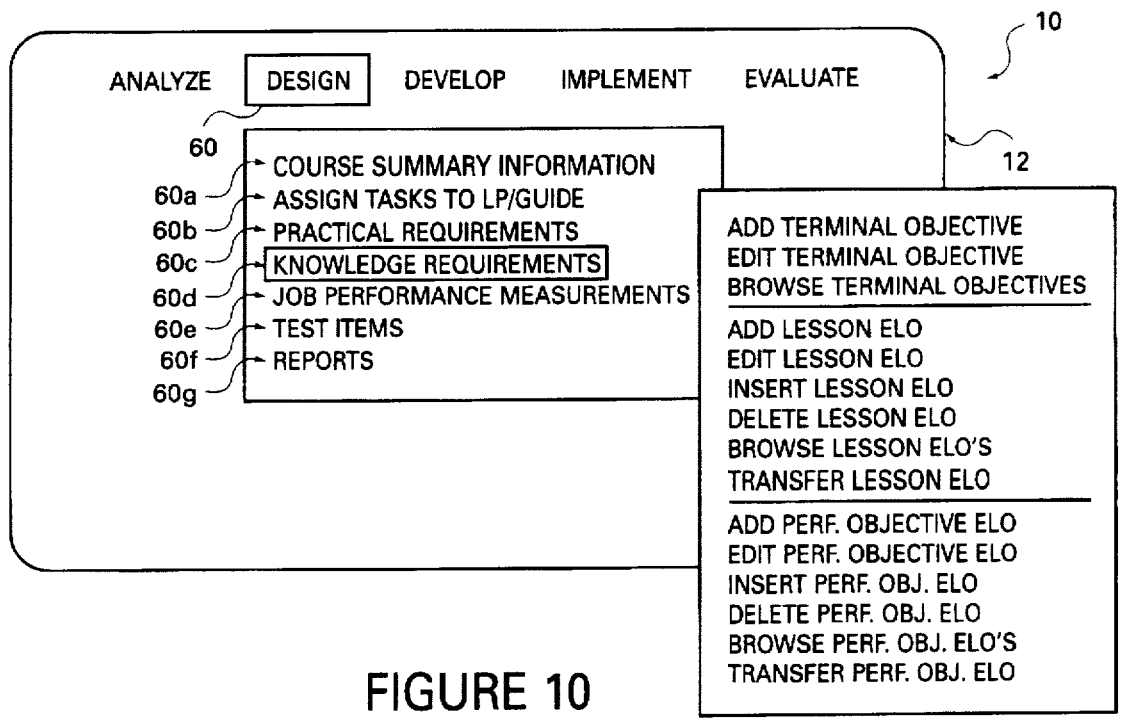
FIG. 10 is the main menu display screen of the CTMS shown in FIG. 3 further showing details of the "DESIGN" menu, and specifically a "KNOWLEDGE REQUIREMENTS" sub-menu.
Figure 11:
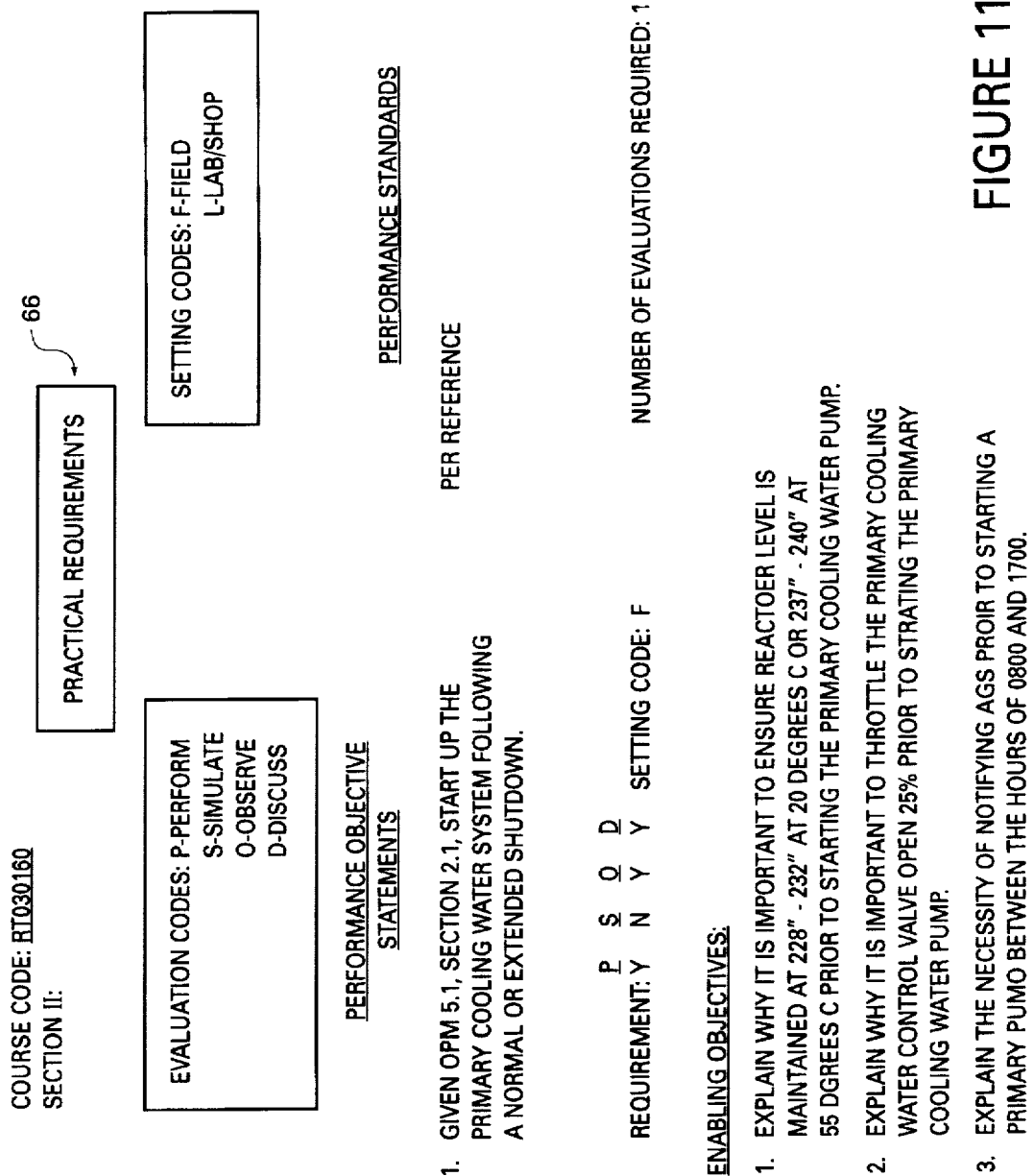
FIG. 11 is a Practical Requirements display screen accessible through "KNOWLEDGE REQUIREMENTS" submenu shown in FIG. 10.
Figure 12:
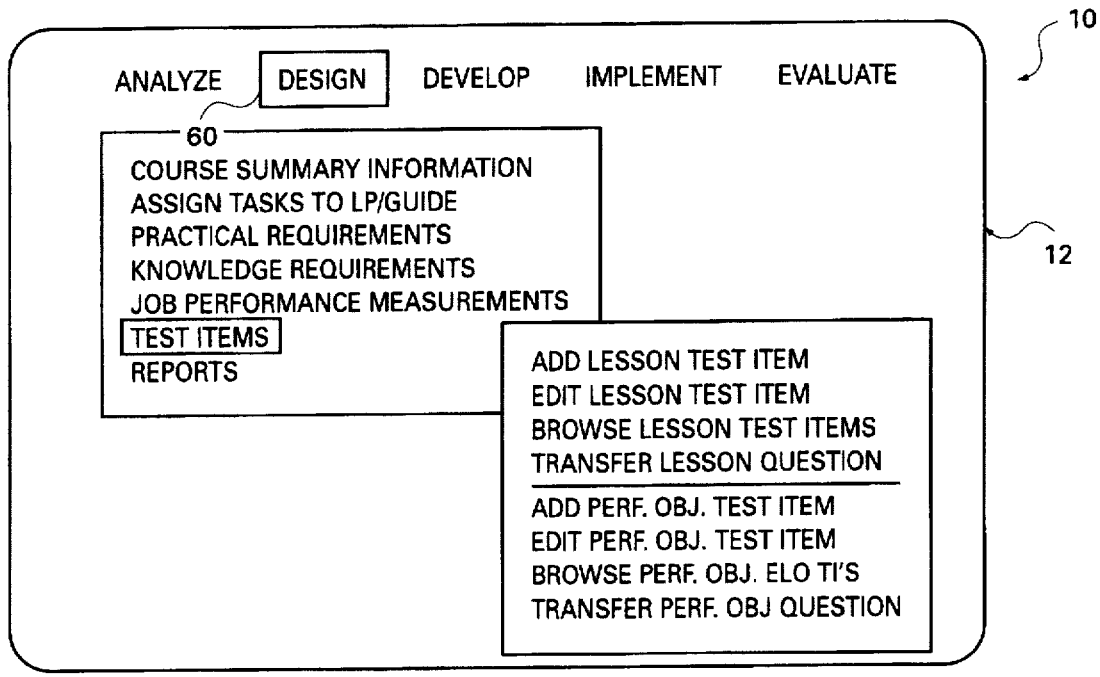
FIG. 12 is the main menu display screen of the CTMS shown in FIG. 3 further showing the "DESIGN" menu, and specifically a "TEST ITEMS" sub-menu in greater detail.

Referring again to FIG. 3 and also specifically to FIG. 8, which illustrates that within the Design phase 60 all courses identified in the related curriculum plan are entered under Course Summary Information 62 (or 60a in FIG. 10). Tasks are assigned to lesson plans (LP) under "ASSIGN TASKS TO LP/GUIDE", 60b. Performance Objective Statements 64a (FIG. 9) are assigned to courses under the Practical Requirements 60c menu item, see FIG. 10. Details of the Practical Requirements submenu 60c (FIG. 10) are illustrated in FIG. 9 which shows related Evaluation Codes 63a, Setting Codes 63b and both Performance Objective Statement 64a and Performance Standards 64b. Tasks are then suitably linked to their Performance Objective and Performance Standard. Objectives are also appropriately tied to reference documents. In addition, for each objective test, related menu items are written. Decision on requirements to "PERFORM", "SIMULATE", "OBSERVE", or "DISCUSS" for Training and Evaluation are made along with the number of EVALUATIONS REQUIRED, then a qualification card may be printed, if so desired.

Referring now to FIG. 10, the Design phase portion of display 12 of CTMS 10 consists of items; Course Summary Information 60a, Assign Tasks to LP/Guide 60b, Practical Requirements 60c, Knowledge Requirements 60d, Job Performance Measures 60e, Test Items 60f, and Reports 60g.

Course Summary Information 60a is added, edited or browsed. Course codes and titles are suitably entered in a hierarchical order in this preferred application of the invention, in addition Performance Objective, Unique Task Number and Task Title are linked. Desired Course Summary Information 60a related to method of instruction (lecture, self study, on-job-training, seminar, audio visual, etc.) is determined. Also, Course performance objectives and intended trainers to be used are identified.

ASSIGN TASKS TO LESSON PLAN (LP) GUIDE 60b (see FIG. 10) are added and edited. The method in which performance objectives are assigned to lesson plans is via unique numbering of the associated task and course coding.

Practical Requirements 60c are selectively added, edited, browsed, deleted or inserted. The method of evaluation codes (perform, simulate, observe, or discuss), setting codes (field and lab/shop) and number of evaluations are assigned. The Performance Objective Statements and Performance Standards are entered and linked to reference document(s). An automated sequence of performance requirements are maintained when data is entered or inserted between other data, and when data is deleted, preserving the links and sequencing.

Knowledge Requirements 60d in the form of suitably selected terminal objectives, lesson enabling learning objectives and performance objective enabling learning objectives are entered. The method in which each objective is linked to a course and one or more reference document(s) is determined. Methods of instruction for each enabling objective are identified as; lecture, self study, on-the-job training, seminar or audio/visual. The settings for each objective are identified as classroom, lab/shop, and field. The sequence of performance objectives and enabling learning objectives is automatically maintained when data is entered, inserted between other data, or when deleted.

Job Performance Measurements 60e is operably linked to the Performance Objective Statements and related Performance Standards. The Job Performance Measurements identifies the job position, prerequisites, references, evaluator, preparation, initial conditions, initiating cues, final condition, process evaluation, standards, and related knowledge requirements.

Test Items are entered, edited, browsed, or transferred. By the method of the invention, Test Items are suitably linked to training program, course/lesson plan code, unique number, performance objective number, enabling objective number, test item number, figure number, objective statement, test item statement, test item answer/point values, identify type of test item (short answer & completion, essay, multiple choice, true/false, modified true false, matching), difficulty rating, response time, point value, quiz status, validation signatures, certification categories and reference documents.

Reports 60g generated by CTMS, in the Design phase, are: summary information, task-to-performance objective, practical requirements, knowledge requirements, job performance measures, test item input change form, task-to-train cross-reference, train to task cross reference, performance objective to OJT guides cross reference. Qualification cards may be generated by the administrator.

3. Development Phase

The following database tables are components of the Development Phase in the preferred embodiment disclosed here;

EXAMS TABLE . . . Exam Cover Sheets
EXAMBANK TABLE . . . Test Items Listing
POBANK TABLE . . . Perf. Objective Listing
EXAMPART TABLE . . . Exam Parts/Sections
EXAMPICK TABLE . . . List of Questions A Master Reference List is generated from the information entered in the DOCUMENTS Table during the Design Phase. This is presented to provide all users access to the reference library of technical information. Entries are unlimited, and need not be written documentation, for instance, a qualified individual's name may be entered as a reference.

The Examination Bank application is the most powerful feature in the Development Phase. The structure is arranged to permit multiple users to simultaneously develop exams as others are designing new or revising existing courses in the program. The application is tailored to facilitate the construction of an exam as it would be approached by the trainers without the use of a computer. The speed of the data management then make the computer application the preferred method of exam building, with the added benefit being no additional training requirements due to the familiarity of the process. The use of courses and lessons to manage the exam may be bypassed, with certification categories or performance objectives used instead.

The Exam Bank Update Process is a predetermined set of merges and queries, using data from the PO, ELO, TI and TI_CERT Tables to construct a larger data listing (using the tables listed above) suitable for use in selecting questions through the entry of several levels of filter criteria. The speed is enhanced in the network environment by constructing an individual row in the table for each of typical sort criteria variable conditions. This duplication of data in the table would be unnecessary and burdensome in the Design Phase, however is effective in achieving the desired functions in the Development Phase. The EXAMPICK Table is constructed to provide an easy look up list used in the Implementation Phase.

Figure 14:
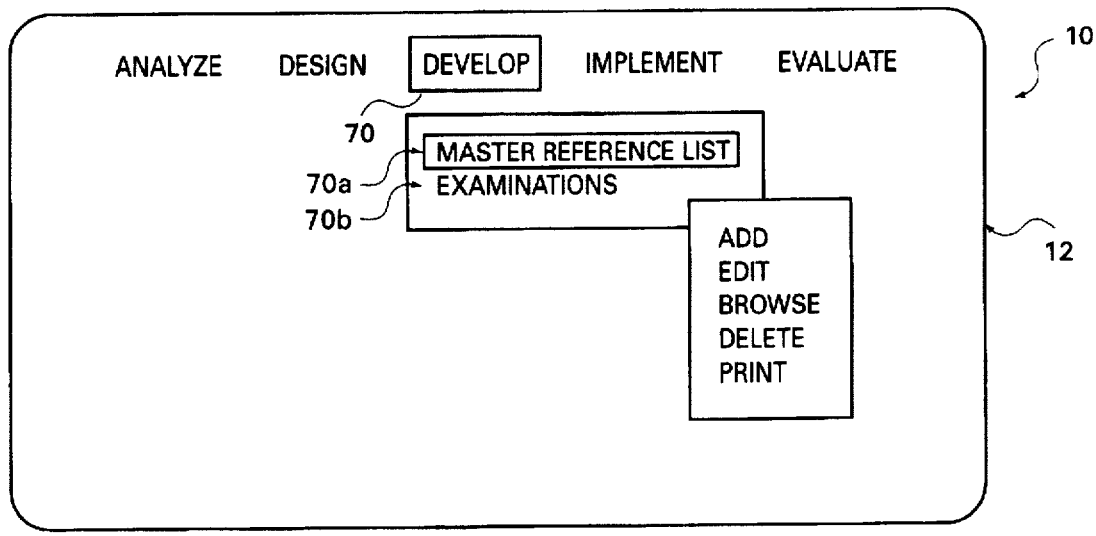
FIG. 14 is the main menu display screen of the CTMS shown in FIG. 3 showing the "DEVELOP" menu and its sub-menus in greater detail.

Referring to FIG. 14, the Development phase portion 70 of the CTMS 10 is shown to consist of a the Master Reference List 70a and Examinations 70b. The Master Reference List 70a can added, edited, browsed, deleted, or printed. Each document identification code is suitably linked to a related document title.

Examinations 70b generated by the preferred embodiment being described are, system checkouts, performance objective discussion, mid-term exam, final certification exam, oral and demonstrative exam, quarterly re-certification exam, review objectives & questions.

Examinations 70b can be created, revised, deleted or printed. Construction of the Examination menu item allows selection of certification category, difficulty range, course, lessons and performance objectives. The related exam cover page is generated and automatically adds a related point value.

An automated exam generator builds a separate exam bank that can be edited by adding, revising or deleting test items without corrupting the original test items and exams can be constructed by selecting questions from several different training program levels or programs.

4. Implementation Phase (Trainees)

The data entered during the preceding three phases may now be presented to the users as it would in a curriculum course listing, learning objectives and questions. There are no separate database tables for the Implementation Phase, as this would be unnecessary duplication. The EXAMPICK Table created during the Exam Bank Update Process defined above is the data source for all questions, with the COURSE and ELO Tables providing the top level information.

The application permits the user to access the information in a manner to complement self study of the reference documents. In addition, a self testing feature is provided to permit the trainee to prepare for verbal exams administered by trainers on both lessons and performance objectives.

Figure 15:
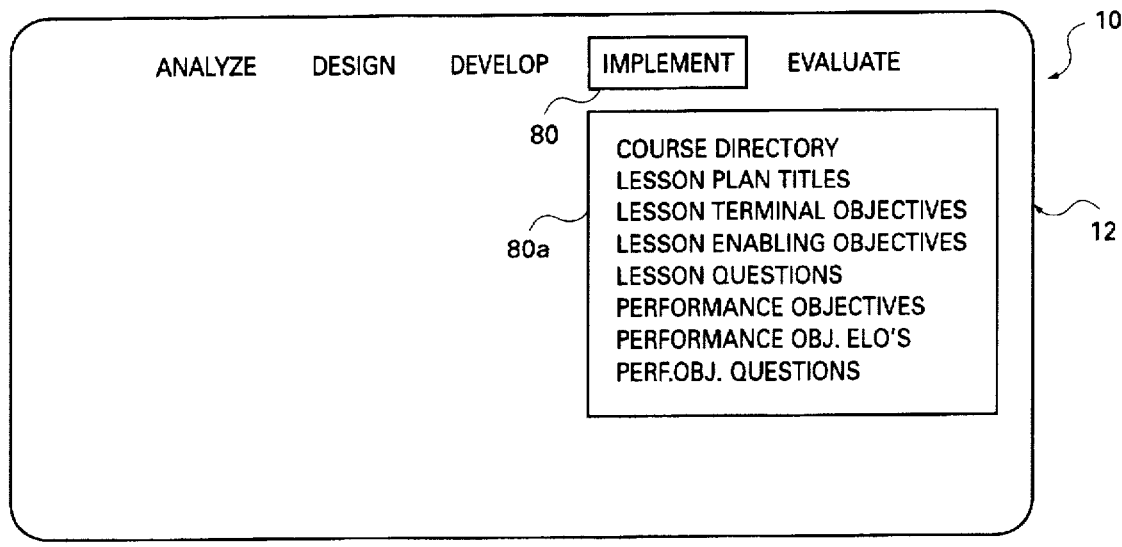
FIG. 15 is the main menu display screen of the CTMS shown in FIG. 3 showing the "IMPLEMENT" menu and its sub-menus in greater detail.

Referring to FIG. 15, it will be seen that the Implementation phase portion of CTMS 10 display name 12 consists of Course Directory, Lesson Plan Titles, Lesson Terminal Objectives, Lesson Enabling Objectives, Lesson Questions, Performance Objectives, Performance Objective ELOS (enabling learning objectives), and Performance Objective Questions, all of which are on-line for all trainees, trainers, and incumbents in the job site and training environments. This portion of the program is used during either OJT(on-the-job-training) or self-study for preparation of taking task or system checkouts and or exams.

Course Directory 80a links a selected Course Code with the related Course Title and Course Performance Objective. The Lesson Plan Titles operably links the Course Code to the Lesson Code and Lesson Title. The Lesson Terminal Objectives are linked to the Lesson Code. The Lesson Enabling Objectives The Lesson Questions and answers are available on-line for each lesson.

5. Evaluation Phase (Maintain CTMS)

The following database tables are components of the Evaluation Phase:

CTCOURSE TABLE . . . Cont. Training Courses
IMPACT TABLE . . . Impact on Training
IMPASSIGN TABLE . . . Assignments
IMPLIST TABLE . . . Responses
EVAL_ANALYSIS TABLE . . . Analysis Data
EVAL_DESIGN TABLE . . . Design Data
EVALDEVELOP TABLE . . . Development Data
EVAL_IMPLEMENT TABLE . . . Implement. Data
EVAL_PDM TABLE . . . Plant Desc. Manual Data
EVAL_OPM TABLE . . . Oper. Procedures Data
EVAL_OTHER TABLE . . . Training Data The sensitivity to reference documents pays off at this stage in the program information management. Typically, the technical documentation changes initiate mandated training requirements. The features of the application to draw a response from the users effectively updates the training program and tracks all activities until the continuing training requirements for the job incumbents have been satisfied. The features permit assignment of individuals to determine the impact on training of a change or new document input: determining the impact on the affected tasks (Analysis Phase); determining the impact on the affected learning objectives and test items (Design Phase); recommending and tracking the corrections to references and training documents (Development Phase); assigning and tracking continuing training (Implementation Phase); and reporting status on all phases activities, including a count of all the available products in the database.

Figure 16:
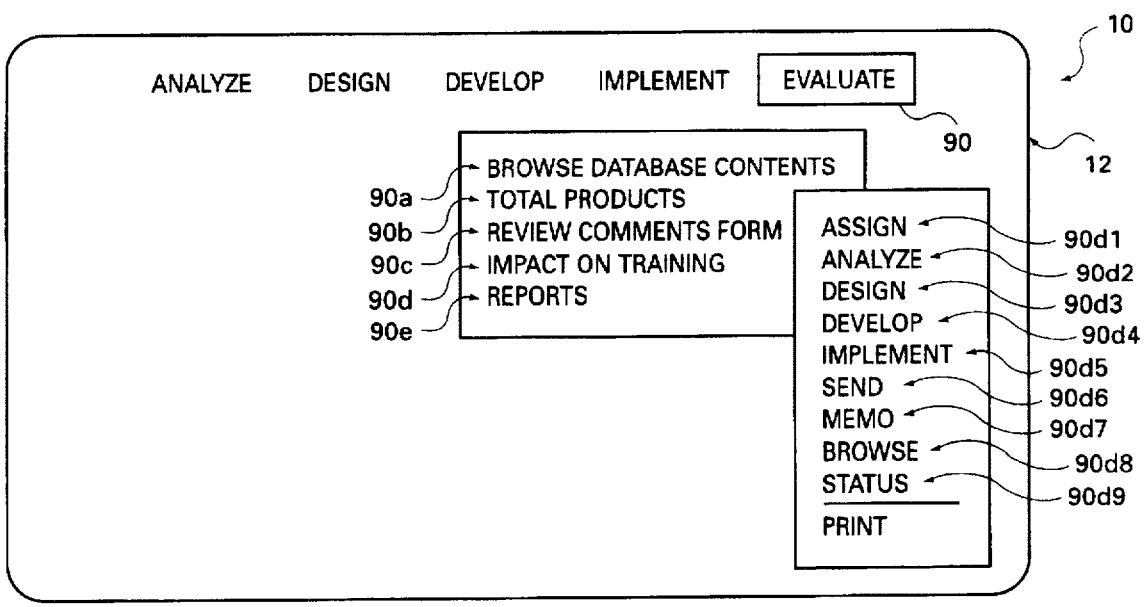
FIG. 16 is the main menu display screen of the CTMS shown in FIG. 3 showing the "EVALUATE" menu and its sub-menus in greater detail.

Referring to FIG. 16, it is shown that the Evaluation Phase portion 90 of CTMS display 12 consists of Browse Database Contents, Total Products, Review Comments Form, Impact on Training, and Reports menu items, so as to maintain the entire appropriately interrelated training program. A training program supervisor can evaluate the impact of a reference document revision or change on the other products of the training program using the CTMS Evaluation features. These features allow the evaluator to have selectivity to evaluate only a chosen range of those test items and learning objectives that may be potentially affected. Such optimum selectivity is implemented in a conventional manner by using key words or reference document search terms.

Similarly, an operator can evaluate the impact of changes on training links, or assigned task, on related reference documents, status, courses, and personnel. Under Impact On Training 90d, an Analysis section 90d2 is operably linked to related Reference Documents and enables the operator to perform a key word search. This allows access to all the potentially affected task statements. Advantageously, task statements can be modified in this portion of the program on-line, avoiding the need to return to ANALYZE menu features.

A Design phase section 90d3 (FIGS. 16 and 13) is linked to Reference Documents and can be used to perform a key word search. This allows access to all the potentially affected Performance Objectives, Enabling Learning Objectives, and Test Items. Test items can be modified in this portion of the program, avoid the need to return to the DESIGN menu features.

A Development section 90d4 (FIG. 16) sorts selected source documents, originates documents, identifies open items and prints reports.

An Implementation section 90d5 (FIG. 16) sorts on source document, courses, and training provided. The related reports generated are total products, impact memo, and Status (90d8) reports. In the Evaluate section 90 (FIG. 16), Total Products counts the number of courses, lesson plans tasks, performance objectives, job performance measures, terminal learning objectives and test items.

Review and comments forms are generated for each specific course, as desired by an operator, and can then be browsed (90d7), sent (90d6), printed (90d9) or electronically filed.

Desirably, each application of the CTMS will be made to employ the minimum number of forms, preferably only one, such as the Job Task Input/Change Form, for the entire related Analysis phase.

CTMS may be used by a central training authority to monitor, evaluate and manage more than one training program; likewise CTMS is configured so there is a database for each "level" of a training program. For instance, a Fundamental Training Level is made to use only one database, and the Systems/Equipment Training Level another. The two are managed by a suitable conventional distributed database management application. The information in different databases and different training programs can be merged, compared and updated. This facilitates sharing of common information, instead of duplicating it in databases.

6. CTMS Maintenance

To monitor more than one training program database, a higher-level application is provided to perform such complex multiple relational database functions. This application, entitled "MAINTAIN", is typically only used by the database administrator and supervisors. The menu selections permit speed enhancement through optimization of the database data; backing up the databases; developing one exam from multiple databases; updating exam banks; transferring a limited rendition of the training program databases to the Wide Area Network (WAN); conducting the Evaluation Phase functions across multiple databases; and evaluating and reporting status on all activities in one or more training programs' databases.

The maintenance of any one or all databases (i.e., backing up, speed enhancement, etc.) are simple menu picks from one application. The separate databases and applications for each program permit ease of granting password-controlled access. A "For Training Use Only" copy can be sent to other networks. This invites the user groups to participate in the training functions by proposing changes through feedback to the training organizations—using the same system and information without directly affecting the original data.

7. Operation

The operation of CTMS 10 is illustrated by the data base interrelations flow chart shown in FIGS. 4a to 4c. Schedule C, below (before the claims) discloses a printout for a preferred operating program in Rbase that stores data and controls the CTMS. Preliminary work requires that all reference documents used within an organization should be gathered. Such reference documents include pertinent operating procedures, administrative procedures, tickler cards, reportable occurances, technical specifications, safety analysis reports, etc. Appropriate abbreviations are then determined for each of the reference documents. Abbreviations should be consistent throughout to assure search capabilities and proper maintenance and updating of the codes.

The three dashed boxes in FIGS. 4a to 4c, respectively labeled Analysis Phase, Development Phase and Evaluation Phase outline the functions within each of those phases and the arrows show the order of their implementation; the details of which are more fully explained above for many illustrative examples. Those three phases are linked, as shown by the design section functions outside of the three dashed boxes.

The PLIST and CONTROL tables in FIGS. 4a to 4c are not shown linked to any of the three phases. In operating the CTMS the PLIST table is used to assign passwords and levels of access rights to users and is read during the startup of the database. Data is entered by a database administrator through Rbase. The CONTROL table contains the name of the database owner (Training Group Leader) and the date the database last backed-up, etc for use in the MAINTAIN application.

Regarding operation of the Design Phase and Evaluation Phase, while in the Design Phase, data for the Course, PO, LP, ELO and TI tables are entered, as well as certification codes and category references. The exam generator program in the MAINTAIN application is run to create: 1) the EXAMPICK table by combining the TI, ELO, LP, TI_CERT and TITOREF tables; 2) the EXAMBANK table by combining the EXAM PICK table with the existing EXAMBANK table saved exams; 3) the POBANK table by combining the PO, ELO and TI tables. This is done so that in the implementation phase the test items may be queried by course, lesson plan, objective, difficulty level, or certification code and ongoing changes in the design phase do not affect what is seen in the implementation phase until the exam generator program is run as directed by the training supervisor.

While only selected embodiments of the present invention have been shown and described, it should be obvious that many changes and modification may be made thereunto without departing from the spirit and scope of the invention; accordingly the following claims are intended to define the scope of the invention.

7. Schedule C (Sample Computer Program for the main menu for Operating a Relational Database Management System using a conventional SQL-compliant software platform to implement the CTMS)

```
$COMMAND
RONEW
DISCONNECT
SET QUOTE ='
SET VAR SAVE_MESSAGES (CVAL('MESSAGES'))
SET VAR SAVE_ERROR = (CVAL('ERROR'))
SET MESSAGES ON
SET STATICDB OFF
SET ROWLOCKS ON
DEBUG SET MESSAGES ON
RUN STARTUP IN RONEW.APX
SET ERROR MESSAGES ON
DEBUG SET ERROR MESSAGES ON
NEWPAGE
SET COLOR WHITE ON BLUE
SET BELL ON
LABEL LBEG1
  NEWPAGE
  CHOOSE PICK1 FROM MAIN IN RONEW.APX AT 1 1
  YELLOW ON BLUE
  SET V PICK11 = (SSUB(.PICK1,1)), +
    PICK12 = (SSUB(.PICK1,2))
  CLEAR VAR PICK1
  IF PICK12 = 'HELP' THEN
    GOTO MAINHELP
  ENDIF
  IF PICK12 = '[ESC]' THEN
    GOTO LEND1
  ENDIF
  SWITCH (.PICK11)
  CASE 1
    SWITCH (.PICK12)
    CASE 'DUTY AREAS'
      RUN DARUN IN RONEW.APX
      BREAK
```

```
      CASE 'TASKS'                                      RUN REVCOM IN RONEW.APX
        RUN TASKS IN RONEW.APX                          BREAK
        BREAK                                         CASE 'IMPACT ON TRAINING'
      CASE 'REPORTS'                                    RUN IMPACT IN RONBW.APX
        RUN JAREPORT IN RONEW.APX                       BREAK
        BREAK                                         CASE 'REPORTS'
      ENDSW                                             RUN EVALREPT IN RONEW.APX
      BREAK                                             BREAK
    CASE 2                                            ENDSW
      SWITCH (.PICK12)                                BREAK
      CASE 'COURSE SUMMARY INFORMATION'             ENDSW
        RUN SUMMARY IN RONEW.APX                    GOTO LBEG1
        BREAK                                      LABEL MAINHELP
      CASE 'ASSIGN TASKS TO LP/GUIDE'                 SWITCH (.PICK1 1)
        RUN TASKLP IN RONEW.APX                       CASE '1'
        BREAK                                           NEWPAGE
      CASE 'PRACTICAL REQUIREMENTS'                     DISPLAY ANALYSIS IN RONEW.APX
        RUN PRACTICL IN RONEW.APX                       PAUSE 1
        BREAK                                           BREAK
      CASE 'KNOWLEDGE REQUIREMENTS'                   CASE '2'
        RUN KNOW IN RONEW.APX                           NEWPAGE
        BREAK                                           DISPLAY DESIGNPH IN RONEW.APX
      CASE 'JOB PERFORMANCE MEASURES'                   PAUSE 1
        RUN JPM IN RONEW.APX                            BREAK
        BREAK                                         ENDSW
      CASE 'TEST ITEMS'                               GOTO LBEG1
        RUN TESTITEM IN RONEW.APX                  LABEL LEND1
        BREAK                                      CLEAR VAR PICK1
      CASE 'REPORTS'                               CLEAR VAR PICK11
        RUN DESREPT IN RONEW.APX                   CLEAR VAR PICK12
        BREAK                                      SET MESSAGES .SAVE_MESSAGES
      ENDSW                                        SET ERROR MESSAGES .SAVE_ERROR
      BREAK                                        CLEAR VAR SAVE_MESSAGES, SAVE_ERROR
    CASE 3                                         NEWPAGE
      SWITCH (.PICK12)                             RUN CLEANUP IN RONEW.APX
      CASE 'MASTER REFERENCE LIST'                 RETURN
        RUN DOCUMENT IN RONEW.APX                  $MENU
        BREAK                                      MAIN
      CASE 'EXAMINATIONS'                          PULLDOWN |
        RUN EXAMS IN RONEW.APX                     |ANALYZE|
        BREAK                                      |DESIGN|
      ENDSW                                        |DEVELOP|
      BREAK                                        |IMPLEMENT|
    CASE 4                                         |EVALUATE |
      SWITCH (.PICK12)                             ENDC
      CASE 'COURSE DIRECTORY'                      POPUP |
        RUN CRSDIR IN RONEW.APX                    |DUTY AREAS|
        BREAK                                      |TASKS|
      CASE 'LESSON PLAN TITLES'                    |REPORTS|
        RUN LPTITLE IN RONEW.APX                   ENDC
        BREAK                                      POPUP |
      CASE 'LESSON TERMINAL OBJECTIVES'            |COURSE SUMMARY INFORMATION|
        RUN TLOREAD IN RONEW.APX                   |ASSIGN TASKS TO LP/GUIDE|
        BREAK                                      |PRACTICAL REQUIREMENTS|
      CASE 'LESSON ENABLING OBJECTIVES'            |KNOWLEDGE REQUIREMENTS|
        RUN ELOREAD IN RONEW.APX                   |JOB PERFORMANCE MEASURES|
        BREAK                                      |TEST ITEMS|
      CASE 'LESSON QUESTIONS'                      |REPORTS|
        RUN LPTIREAD IN RONEW.APX                  ENDC
        BREAK                                      POPUP |
      CASE 'PERFORMANCE OBJECTIVES'                |MASTER REFERENCE LIST|
        RUN POREAD IN RONEW.APX                    |EXAMINATIONS|
        BREAK                                      ENDC
      CASE 'PERF. OBJECTIVE ELO'S'                 POPUP |
        RUN PELOREAD IN RONEW.APX                  |COURSE DIRECTORY|
        BREAK                                      |LESSON PLAN TITLES|
      CASE 'PERF. OBJ. QUESTIONS'                  |LESSON TERMINAL OBJECTIVES|
        RUN POTIREAD IN RONEW.APX                  |LESSON ENABLING OBJECTIVES|
        BREAK                                      |LESSON QUESTIONS|
      ENDSW                                        |-|
      BREAK                                        |PERFORMANCE OBJECTIVES|
    CASE 5                                         |PERF. OBJECTIVE ELO'S|
      SWITCH (.PICK12)                             |PERF. OBJ. QUESTIONS|
      CASE 'BROWSE DATABASE CONTENTS'              ENDC
        RUN ANYDB IN RONEW.APX                     POPUP |
        BREAK                                      |BROWSE DATABASE CONTENTS|
      CASE 'TOTAL PRODUCTS'                        |TOTAL PRODUCTS|
        RUN PRODUCTS IN RONEW.APX                  |REVIEW & COMMENTS FORM|
        BREAK                                      |IMPACT ON TRAINING|
      CASE 'REVIEW & COMMENTS FORM'                |REPORTS|
```

```
ENDC
$SCREEN
ANALYSIS
```

Analysis Phase Menu

Welcome to the first phase of a systematic approach to training! This program is designed to assist you in maintaining an organized, consistent+approach to the management of training materials.

```
    +
    It is recommended that you enter any existing references first, using +
the input form under "DEVELOP" for "REFERENCES". This will
prevent having to
+
enter the title and code each time you tie a task to a reference.
You may   +
browse through the list of references in the "DEVELOP" menu
selection.   +
    +
    It is also recommended that you enter the duty areas before the
tasks.+
As with the references, you can enter the identification code and the
title   +
will show up on the input form so you can verify your choices.
$SCREEN
DESIGNPH
    Welcome to the second phase of a systematic approach to
training!   +
As with the ANALYSIS PHASE, it is important to enter some
information in the   +
recommended sequence . . .
    The courses must be identified first by using the training   +
specification SUMMARY. This assigns a code number you will need to
use to   +
organize the remaining information to be entered as you design the
course.   +
The second and third input screens (pages) of this form prompt you to
assign   +
tasks to be covered in performance objectives and to list any
lessons/guides   +
planned to be developed.
NOTE: Performance Objectives are tied to the course, not individual
lessons.+
    Next, assign the tasks to lessons/guides - using the ASSIGN TASKS
TO +
LP/GUIDE menu selection.
    The performance objectives are entered using the PRACTICAL   +
REQUIREMENTS section of the training specification.
    Finally, the terminal and enabling objectives may be entered using
the+
KNOWLEDGE REQUIREMENTS menu selection. Enabling objectives
are entered for the+
Systems Level of training for each lesson plan, and enabling objectives
are   +
entered for each performance objective.
$COMMAND
SUMMARY
SET VAR LEVEL3 INT = 1
SET VAR VCASCADE = 'CASCADE'
SNAP C:\TEMP3.$$$
RUN SUMMARY.RMD
RETURN
$COMMAND
TASKLP
SET VAR LEVEL3 INT = 1
SET VAR VCASCADE = 'CASCADE'
SNAP C:\TEMP3.$$$
RUN TASK_LP.RMD
RETURN
$COMMAND
PRACTICL
SET VAR LEVEL3 INT = 1
SET VAR VCASCADE = 'CASCADE'
SNAP C:\TEMP3.$$$
RUN PRACTICL.RMD
RETURN
$COMMAND
KNOW
SET VAR LEVEL3 INT = 1
SET VAR VCASCADE = 'CASCADE'
SNAP C:\TEMP3.$$$
RUN KNOWREQ.RMD
RETURN
$COMMAND
JPM
SET VAR LEVEL3 INT = 1
SET VAR VCASCADE = 'CASCADE'
SNAP C:\TEMP3.$$$
RUN JPM.RMD
RETURN
$COMMAND
TESTITEM
SET VAR LEVEL3 INT = 1
SET VAR VCASCADE = 'CASCADE'
SNAP C:\TEMP3.$$$
RUN TESTITEM.RMD
RETURN
$COMMAND
DESREPT
SET VAR LEVEL3 INT = 1
SET VAR VCASCADE = 'CASCADE'
SNAP C:\TEMP3.$$$
RUN DESREPT.RMD
RETURN
$COMMAND
CRSDIR
SET VAR LEVEL3 INT = 1
SET VAR VCASCADE = 'CASCADE'
SNAP C:\TEMP3.$$$
RUN CRSREAD.RMD
RETURN
$COMMAND
LPTITLE
SET VAR LEVEL3 INT = 1
SET VAR VCASCADE = 'CASCADE'
SNAP C:\TEMP3.$$$
RUN LPTITLES.RMD
RETURN
$COMMAND
TLOREAD
SET VAR LEVEL3 INT = 1
SET VAR VCASCADE = 'CASCADE'
SNAP C:\TEMP3.$$$
RUN TLOREAD.RMD
RETURN
$COMMAND
ELOREAD
SET VAR LEVEL3 INT = 1
SET VAR VCASCADE = 'CASCADE'
SNAP C:\TEMP3.$$$
RUN ELOREAD.RMD
RETURN
$COMMAND
LPTIREAD
SET VAR LEVEL3 INT = 1
SET VAR VCASCADE = 'CASCADE'
SNAP C:\TEMP3.$$$
RUN LPTIREAD.RMD
RETURN
$COMMAND
POREAD
SET VAR LEVEL3 INT = 1
SET VAR VCASCADE = 'CASCADE'
SNAP C:\TEMP3.$$$
RUN POREAD.RMD
RETURN
$COMMAND
PELOREAD
SET VAR LEVEL3 INT = 1
SET VAR VCASCADE = 'CASCADE'
SNAP C:\TEMP3.$$$
RUN PELOREAD.RMD
RETURN
```

```
$COMMAND
POTIREAD
SET VAR LEVEL3 INT = 1
SET VAR VCASCADE = 'CASCADE'
SNAP C:\TEMP3.$$$
RUN POTIREAD.RMD
RETURN
$COMMAND
ANYDB
SET VAR LEVEL3 INT = 1
SET VAR VCASCADE = 'CASCADE'
SNAP C:\TEMP3.$$$
RUN ANYDB2.RMD
RETURN
$COMMAND
PRODUCTS
SET VAR LEVEL3 INT = 1
SET VAR VCASCADE = 'CASCADE'
SNAP C:\TEMP3.$$$
RUN PRODUCTS.RMD
RETURN
$COMMAND
REVCOM
SET VAR LEVEL3 INT = 1
SET VAR VCASCADE = 'CASCADE'
SNAP C:\TEMP3.$$$
RUN REVCOM.RMD
RETURN
$COMMAND
IMPACT
SET VAR LEVEL3 INT = 1
SET VAR VCASCADE = 'CASCADE'
SNAP C:\TEMP3.$$$
RUN IMPACT.RMD
RETURN
$COMMAND
EVALREPT
SET VAR LEVEL3 INT = 1
SET VAR VCASCADE = 'CASCADE'
SNAP C:\TEMP3..$$$
RUN EVALREPT.RMD
RETURN
$COMMAND
STARTUP
CONNECT RONEW
$COMMAND
CLEANUP
RETURN
$COMMAND
DOCUMENT
SET VAR LEVEL3 INT = 1
SET VAR VCASCADE = 'CASCADE'
SNAP C:\TEMP3.$$$
RUN DOCUMENT.RMD
RETURN
$COMMAND
EXAMS
SET VAR LEVEL3 INT = 1
SET VAR VCASCADE = 'CASCADE'
SNAP C:\TEMP3.$$$
CLS
CHOOSE PICKEX FROM ROEXAM.MNU AT 4
IF PICKEX = 0 THEN
 RETURN
ENDIF
SWITCH (.PICKEX)
 CASE '0'
 BREAK
 CASE '1'
 RUN LPTIREAD.RMD
 BREAK
 CASE '2'
 RUN POTIREAD.RMD
 BREAK
 CASE '3'
 RUN MIDEXAM.RMD
 BREAK
 CASE '4'
 RUN CERTEXAM.RMD
 BREAK
 CASE '5'
 RUN ODEXAM.RMD
 BREAK
 CASE '6'
 RUN QTEXAM.RMD
 BREAK
 CASE '7'
 RUN TECHREV.RMD
 BREAK
ENDSW
RETURN
$COMMAND
DARUN
SET VAR LEVEL3 INT = 1
SET VAR VCASCADE = 'CASCADE'
SNAP C:\TEMP3.$$$
RUN DUTYAREA.RMD
RETURN
$COMMAND
TASKS
SET VAR LEVEL3 INT = 1
SET VAR VCASCADE = 'CASCADE'
SNAP C:\TEMP3.$$$
RUN TASKS.RMD
RETURN
$COMMAND
JAREPORT
SET VAR LEVEL3 INT = 1
SET VAR VCASCADE = 'CASCADE'
SNAP C:\TEMP3.$$$
RUN JAREPORT.RMD
RETURN
```

We claim:

1. A Computerized Training Management System operable in a multiple relational databases environment for creating and maintaining at least one computerized training material database having a plurality of training data and documents, the computerized training material database being correlated to at least one related reference manual database having a plurality of identified reference documents, the System comprising:

means for creating at least one computerized training material database having a plurality of training data and documents arranged into a plurality of training phases; and means for creating at least one computerized reference manual database having a plurality of identified related reference documents;

computerized means for serially linking and correlating said plurality of training phases and for directly linking all of the training phases in parallel to the reference manual database, said computerized means being operable to enable a user working with any of said training phases to select menus that allow for inputting, editing or browsing items in each selected menu thereby to systematically enhance features facilitating the analysis, design, development, implementation and evaluation of the training management system performance and its content validity while simultaneously updating existing materials in all of the other training phases to assure validity of the resultant data throughout the training management system;

computerized means for searching said training material database using a correlated reference document code for thereby determining related training data and documents; and computerized means for automatically updating all of said linked and related training data and documents and said reference manual database of reference documents, responsive to a change being made in any one of said data and documents.

2. The Computerized Training Management System according to claim 1, including means that includes a Task database.

3. The Computerized Training Management System according to claim 1, wherein said means for creating at least one training material database includes a Performance Objective table.

4. The Computerized Training Management System according to claim 1, wherein said means for creating at least one computerized training material database includes an Enabling Learning Objective table.

5. The Computerized Training Management System according to claim 1, wherein said means for creating at least one computerized training material database includes a Test Item table.

6. The Computerized Training Management System according to claim 1, wherein said plurality of training phases are respectively designated; Analyze, Design, Develop, Implement, Evaluate, with all of the training phases being conformable to a systematic approach to learning to ensure the validity of data and documents in all training phases of the System for determining the necessary skills, knowledge and elements for entry level trainees through their training and final training certification.

7. The Computerized Training Management System according to claim 1, wherein said means for creating and searching at least one computerized training material database includes a MAINTAIN data base and application.

8. A method of maintaining a computerized training material database having a plurality of training data and documents, the computerized training material database being correlated to at least one related reference manual database having a plurality of identified reference documents, the method comprising the steps of:

providing at least one training material database having a plurality of training data and documents arranged into a plurality of training phases;

providing at least one reference manual database having a plurality of identified related reference documents;

linking said plurality of training phases in series to one another and each of the training phases in parallel to the reference manual database, said linking step allowing a user working with any of said training phases to select menus that allow for inputting, editing or browsing items in each selected menu thereby to systematically enhance features facilitating the analysis, design, development, implementation and evaluation of the training management system performance and its content validity while simultaneously updating existing materials in all of the other training phases to assure validity of the resultant data throughout the training management system;

searching said training material database using a correlated reference document code thereby determining related training data and documents; and updating all of said linked and related training data and documents and said reference manual database of reference documents responsive to a change in any one of said data and documents.

* * * * *